H. A. PEDRICK.
BORING HEAD.
APPLICATION FILED JAN. 24, 1917.
1,230,020.
Patented June 12, 1917.
2 SHEETS—SHEET 2.
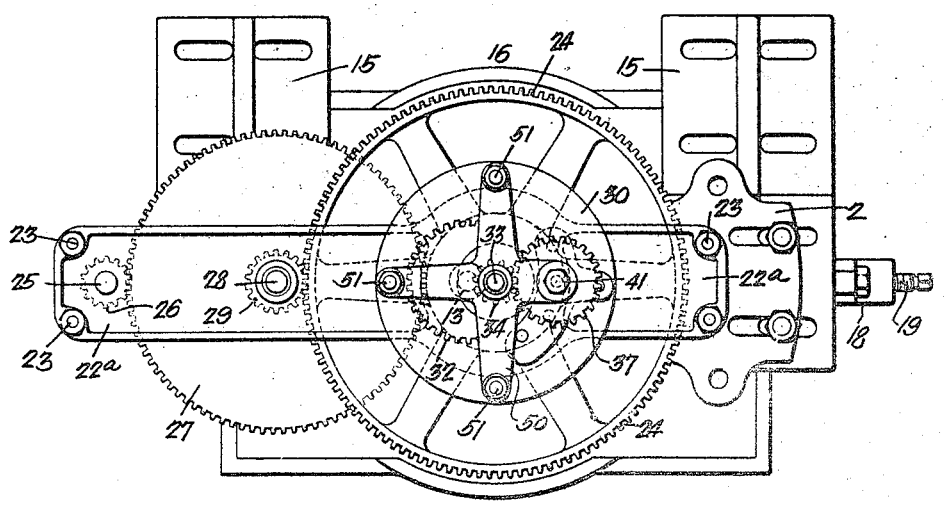
Fig. 2.
Fig. 4.
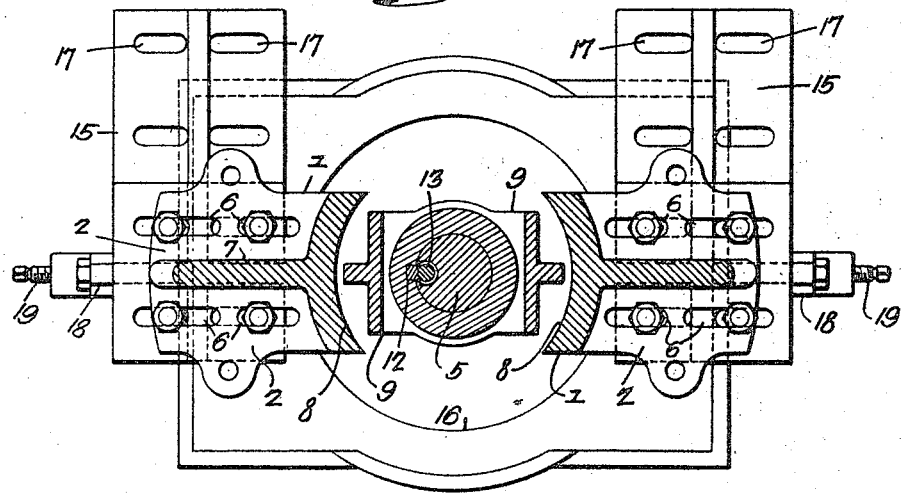
Fig. 3.
Inventor—
Howard A. Pedrick.
by his Attorneys,
Howson & Howson

UNITED STATES PATENT OFFICE.

HOWARD A. PEDRICK, OF BALA, PENNSYLVANIA, ASSIGNOR TO PEDRICK TOOL AND MACHINE COMPANY, OF PHILADELPHIA, PENNSYLVANIA, A FIRM CONSISTING OF ALBERT D. PEDRICK AND HOWARD A. PEDRICK.

BORING-HEAD.

1,230,020.  Specification of Letters Patent.  Patented June 12, 1917.

Application filed January 24, 1917.  Serial No. 144,205.

*To all whom it may concern:*

Be it known that I, HOWARD A. PEDRICK, a citizen of the United States, and a resident of Bala, Montgomery county, Pennsylvania, have invented a Boring-Head, of which the following is a specification.

One object of my invention is to provide a simple, compact and conveniently portable form of boring head especially designed for use in re-boring engine cylinders although by no means limited to this work;—the invention particularly contemplating a novel arrangement and construction of the boring bar, feed screw and feed nut.

It is further desired to provide a boring head having its various parts so designed and assembled as to permit the boring or tool-carrying bar to properly perform its functions although supported at one end only;—the construction being such as to facilitate the application of the device to and its removal from the structure upon which it is intended to operate.

Another object of the invention is to provide a novel form of boring head and driving mechanism in which the parts are so arranged that said mechanism is supported solely by the head.

These objects and other advantageous ends I secure as hereinafter set forth, reference being had to the accompanying drawings, in which, Figure 1 is a side elevation, partly in section illustrating a boring head, together with certain of the parts associated therewith constructed and arranged according to my invention;

Fig. 2 is an elevation of one end of the apparatus shown in Fig. 1;

Fig. 3 is a transverse section on the line 3—3, Fig. 1;

Fig. 4 is a diagrammatic view illustrating the arrangement of certain of the gearing employed; and Figs. 5 and 6 are perspective views illustrating the detail construction of two of the parts of my invention.

Figure 1:
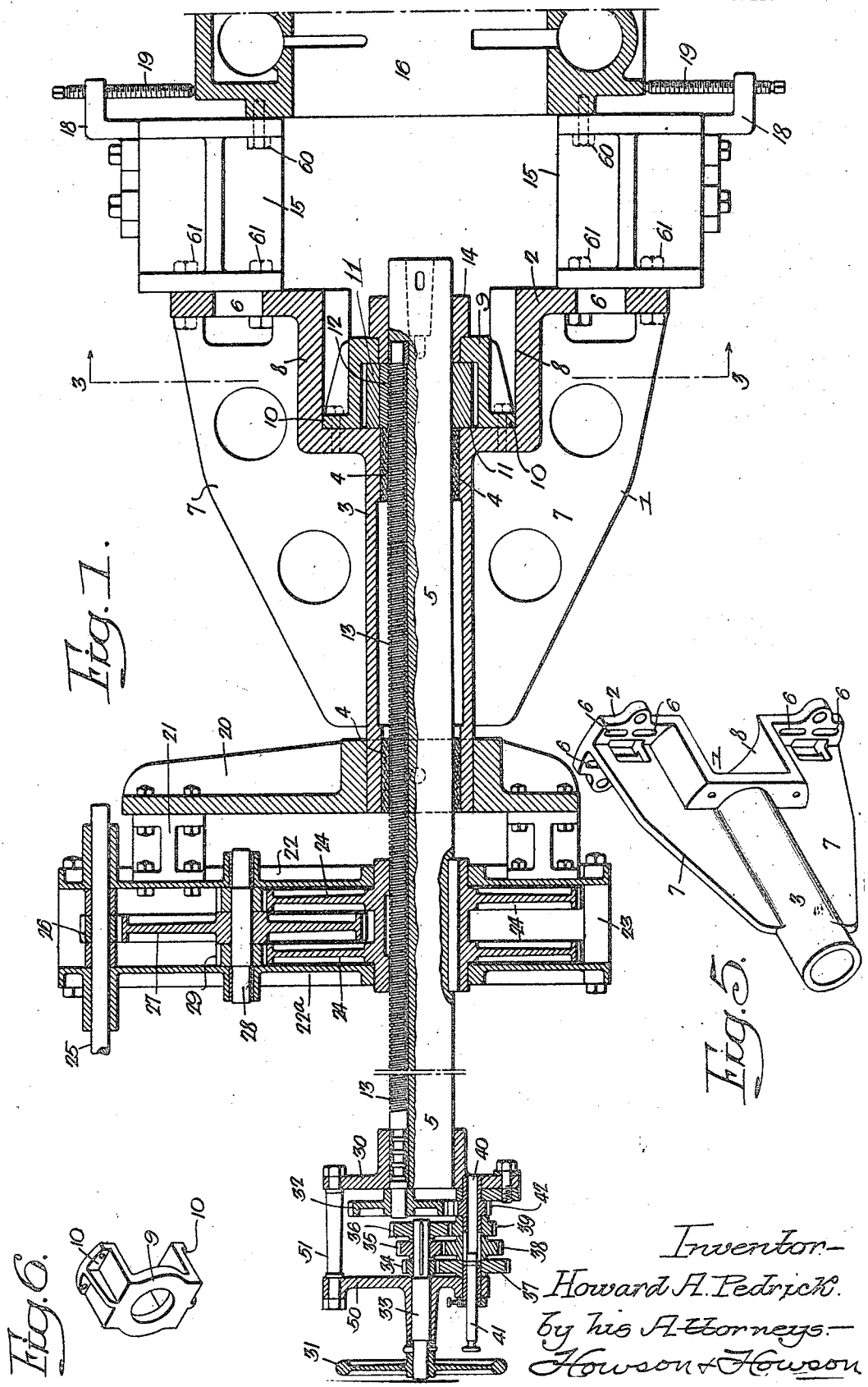

In the above drawings 1 represents the frame or supporting structure of my boring head, which includes a tubular portion or sleeve 3 carrying bearings 4 for the cutter-or tool-carrying bar 5. At one end said sleeve 3 is provided with a pair of oppositely projecting foot-like extensions 2 having flat bolting faces in which are formed elongated parallel slots 6, preferably though not necessarily arranged in two sets on opposite sides of webs 7 whereby said extensions are suitably braced to the sleeve. The extensions 2 include cylindrically curved side portions 8 concentric with the sleeve 3 and have mounted between them a retaining ring or thrust cage 9 including feet 10. Confined between this ring 9 and the adjacent end of the sleeve 3 is a collar 11 constituting a feed nut retainer and having a slot parallel with its center line for the reception of a feed nut 12. This is designed to coöperate with or be engaged by a feed screw 13 rotatably mounted within a longitudinal slot or depression in the cutter or tool carrying bar 5, which passes through and is guided by a collar 14 carried by the ring 9.

The foot portions 2 of the frame 1 are preferably designed to be bolted to one face of a pair of supporting or filling blocks 15, whose opposite parallel face is formed for bolting to the structure, such as the engine cylinder 16, to be operated on by the tool carried by the boring bar 5. In order to facilitate the mounting of the blocks 15 on said cylinder and their adjustment to the frame 1 of the boring head, they are likewise provided with sets of elongated slots 17 and each block also has bolted to it a bracket 18 carrying an adjusting screw 19 whereby its position, and therefore that of the boring head, may be accurately adjusted relatively to the cylinder after having been loosely mounted thereon and before the clamping bolts 60 are tightly set up.

For driving the cutter bar 5, I rigidly attach to the projecting end of the bearing tube 3 (as by means of a set screw) a supporting plate 20, which through filling or spacing blocks 21, supports a frame carrying a train of driving gears. Said frame includes two substantially similar and parallel plates 22 and 22ª mounted upon the hub of a double gear 24 which is keyed to the boring or cutter bar 5. These two plates are rigidly connected and spaced apart in any suitable manner, as by bolts and sleeves 23, and provide bearings for a shaft 25 to which power may be applied from any desired source. On this shaft is fixed a small gear or pinion 26 meshing with the teeth of a gear 27 fixed to a second shaft 28 rotatably carried by the plates 22 and 22ª and likewise having fixed to it a pair of pinions 29 which respectively engage the teeth of the two sections of the double gear 24.

Any suitable device may be provided for manually turning the feed screw 13, and in the present instance I have shown this as including a flanged plate 30 fixed to the outer end of the boring bar 5 and in turn supporting a cross shaped frame member 50 through columns 51. This latter provides a bearing for the spindle 33 of a hand wheel 31, which through suitable gearing forming no part of the present invention, is designed to turn in either direction a gear 32 which is fixed to the feed screw. For this purpose the spindle 33 on which said hand wheel is fixed has keyed to it three gears 34, 35 and 36, respectively meshing with three other gears 37, 38 and 39, loose on a counter shaft 40 to which any one of them may be operatively connected by a sliding key 41.

This counter shaft has fixed to it a gear 42 which through a pair of gears 43 and 44, is designed to drive the gear 32 in one direction. By suitable adjustment about the counter shaft 40, another gear 45 meshing with the gear 42 may be swung into engagement with the gear 32 at the same time that the gear 44 is caused to disengage the latter, so as to reverse the direction of movement of the feed screw.

With the above described arrangement of parts it is a relatively simple and conveniently accomplished operation to mount and adjust my boring head on any structure which is to be operated on, such as the engine cylinder shown. For this purpose the spacing or filling blocks 15 are loosely mounted on said cylinder by suitable bolts, of which two are shown at 60, and the frame structure 1 is then mounted upon said filling blocks by bolts 61. Thereafter by means of the screws 19, the position of the boring head on the cylinder is adjusted until the center line of the boring bar has been brought to the desired position relatively to the structure to be operated on, whereupon the two sets of bolts 60 and 61 are tightly set up.

Power applied to the shaft 25 will now be transmitted through the gears 26, 27 and 24 to the boring bar 5 which is thereby turned;—it being understood that a suitable tool or cutter or cutter carrying member has been previously mounted in or attached to said bar. By means of the hand wheel 31, the feed screw 13 may be turned and by reason of its coaction with the feed nut 12, may be caused to longitudinally move said bar into and through the cylinder at any desired rate, thereby causing the tool or cutter to operate on the cylinder in the desired manner.

I claim;—

1. The combination in a boring head of a frame having a recess at one end; a boring bar rotatably mounted in said frame and passing through the recess; a feed screw carried by the bar; a feed nut within the recess engaging said screw; means for turning the boring bar; and means for rotating the feed screw.

2. The combination in a boring head of a frame having a recess; a boring bar rotatably mounted in said frame and passing through the recess; a collar mounted in the recess; a feed nut engaged by the collar; a member retaining the collar in the recess to prevent its longitudinal movement; means for turning the boring bar; and a screw engaging the nut for feeding the bar.

3. A boring head consisting of an elongated sleeve having bearings and including bolting feet formed to provide a recess adjacent one end; a boring bar movable through the recess; means for turning said bar; with means including an element in the recess for causing longitudinal feeding of the boring bar.

4. The combination in a boring head of a frame having a recess; a boring bar rotatably mounted in said frame and passing through the recess; a collar in the recess; a feed nut engaged by the collar; means for preventing longitudinal movement of the collar and nut while permitting them to turn with the bar; a feed screw carried by the bar and engaged by the nut; means for rotating the bar; and means for turning the screw independently of the bar to feed the latter at will.

5. The combination in a boring head of a frame consisting of an elongated sleeve and supporting feet at one end of said sleeve; a boring bar rotatably mounted in the sleeve; a feed screw carried by said bar; a nut mounted between the feet of the frame and engaging said feed screw for causing longitudinal movement of the bar when the screw is turned; means for turning the bar; and means for rotating the screw.

6. The combination of a boring head consisting of a sleeve having feet adjacent one end; a frame carried by the opposite end of said sleeve; a boring bar passing through the sleeve and projecting adjacent said frame; a driving shaft journaled in the frame; gearing supported by the frame and operatively connecting said shaft with the boring bar; a feed nut carried by the boring head; a feed screw; and means including gearing carried by the boring bar for causing the feed screw to coöperate with the nut to longitudinally move said bar.

7. A boring head consisting of an elongated sleeve; oppositely placed extensions at one end of said sleeve each consisting of a side member and a slotted bolting plate;

webs respectively bracing said bolting plates to the sleeve; a boring bar journaled in the sleeve; with means for longitudinally moving and rotating said bar.

8. The combination in a boring head of an elongated sleeve; a collar rotatably mounted at one end of said sleeve; means for preventing longitudinal movement of the collar; a feed nut engaging the collar; a boring bar passing through the collar; and a feed screw rotatably carried by the boring bar and engaging with the feed nut.

9. The combination in a boring head of an elongated sleeve; a ring carried by said sleeve but spaced away from one end of the same; a collar rotatably mounted between said end of the sleeve and the ring but prevented from longitudinal movement by the latter; a nut engaged by the collar; a boring bar journaled in the sleeve and passing through the collar; a bearing collar interposed between the boring bar and said ring; and a feed screw carried by the boring bar in position to engage the nut.

10. The combination in a boring head of a supporting structure; a boring bar journaled in said structure; a feed screw rotatably carried by said boring bar to one side of the center line thereof; a nut engaging said feed screw; and means for preventing longitudinal movement of the nut.

In witness whereof I affix my signature.

HOWARD A. PEDRICK.